United States Patent
Kamiya (10) Patent No.: US 9,519,627 B2
(45) Date of Patent: Dec. 13, 2016

(54) GRAMMAR GENERATION FOR XML SCHEMA DEFINITIONS

(71) Applicant: FUJITSU LIMITED, Kawasaki-shi, Kanagawa (JP)

(72) Inventor: Takuki Kamiya, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 629 days.

(21) Appl. No.: 13/921,052

(22) Filed: Jun. 18, 2013

(65) Prior Publication Data

US 2014/0372868 A1    Dec. 18, 2014

(51) Int. Cl.
*G06F 17/22* (2006.01)

(52) U.S. Cl.
CPC ................ *G06F 17/2247* (2013.01)

(58) Field of Classification Search
None
See application file for complete search history.

(56) References Cited

U.S. PATENT DOCUMENTS

2005/0192990 A1* 9/2005 Kharitidi et al. ... G06F 17/2211
2008/0201351 A1* 8/2008 Lammel ............ G06F 17/30917

OTHER PUBLICATIONS

Efficient XML Interchange (EXI) Format 1.0, W3C Recommendation Mar. 10, 2011.
What is this thing called "EXIficient"? http://exificient.sourceforge.net/, EXIficient 0.9.1, Sep. 3, 2012.

* cited by examiner

*Primary Examiner* — Asher Kells
(74) *Attorney, Agent, or Firm* — Maschoff Brennan

(57) ABSTRACT

A method of normalizing an extensible markup language schema definition (XSD) schema type may be used in encoding and/or decoding an extensible markup language (XML) document. The method may include receiving an XSD schema type including a state. The method may also include analyzing the state for a conflict. The conflict may include an event resulting from a local production and one or more events resulting from a foreign production. When the conflict is detected, the method may include ignoring the one or more events resulting from the foreign production and generating a modified grammar for the state including the event resulting from the local production.

26 Claims, 7 Drawing Sheets

GRAMMAR GENERATION FOR XML SCHEMA DEFINITIONS

FIELD

The embodiments discussed herein are related to grammar generation for XML schema definitions.

BACKGROUND

Extensible markup language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of grammatical rules governing the order of elements, boolean predicates associated with the content, data types governing the content of elements and attributes, and more specialized rules such as uniqueness and referential integrity constraints. The process of checking to see if an XML document conforms to an XML schema is called validation, which is separate from XML's core concept of syntactic well-formedness. All XML documents are defined as being well-formed, but an XML document is on check for validity where the XML processor is "validating," in which case the XML document is checked for conformance with its associated schema.

Although the plain-text human-readable aspect of XML documents may be beneficial in many situations, this human-readable aspect may also lead to XML documents that are large in size and therefore incompatible with devices with limited memory or storage capacity. Efforts to reduce the size of XML documents have therefore often eliminated this plain-text human-readable aspect in favor of more compact binary representations.

Efficient XML interchange (EXI) is a binary XML format in which XML documents are encoded in a binary data format rather than plain text. In general, using an EXI format reduces the size and verbosity of XML documents, and may reduce the cost in terms of time and effort involved in parsing XML documents. EXI is formally defined in the EXI Format 1.0 Specification produced by the W3C and dated Mar. 10, 2011, which is incorporated herein by reference in its entirety. An XML document may be encoded in an EXI format as a separate EXI stream. Additionally, the XML document maybe later decoded from the EXI format to an XML document, which may be similar to the original XML document.

An XML document or set of XML documents may include an associated XML schema definition (XSD). The XSD may generally describe the structure of an XML document. When the associated XSD is available for an XML document, the XSD may speed parsing of the XML document. For example, the XSD may provide a "blueprint" according to which the XML document may be parsed.

Prior to being used in encoding XML documents into the EXI format or decoding an EXI stream or an EXI document into XML, the XSD may be normalized into one or more grammars. The grammars are rules that may be used to predict specific sequences of the XML document. An algorithm to generate the grammars for an XSD is included in the EXI Format 1.0 Specification. As used herein the algorithm included in the EXI Format 1.0 Specification is referred to herein as the standard grammar algorithm.

SUMMARY

According to an aspect of an embodiment, a method of normalizing an extensible markup language schema definition (XSD) schema type may be used in encoding and/or decoding an extensible markup language (XML) document. The method may include receiving an XSD schema type including a state. The method may also include analyzing the state for a conflict. The conflict includes an event resulting from a local production and one or more events resulting from a foreign production. When the conflict is detected, the method may include ignoring the one or more events resulting from the foreign production and generating a modified grammar for the state including the event resulting from the local production.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments discussed herein are related to generation of a modified grammar during normalization of an extensible markup language schema definition (XSD) schema type. The normalization of the XSD schema type may be used, for example, in encoding and/or decoding an extensible markup language (XML) document. Modified grammars may be included in modified normalizations that include fewer grammars and/or fewer productions than normalization generated using an efficient XML interchange (EXI) Format 1.0 Specification, or some portion thereof. The EXI Format 1.0 Specification is referred to herein as a standard grammar algorithm. The modified grammar and the modified normalization may have substantially the same effect as the normalization generated using the standard grammar algorithm and may reduce memory usage when compared to the normalizations generated using the standard grammar algorithm.

Embodiments of the present invention will be explained with reference to the accompanying drawings.

Figure 1:
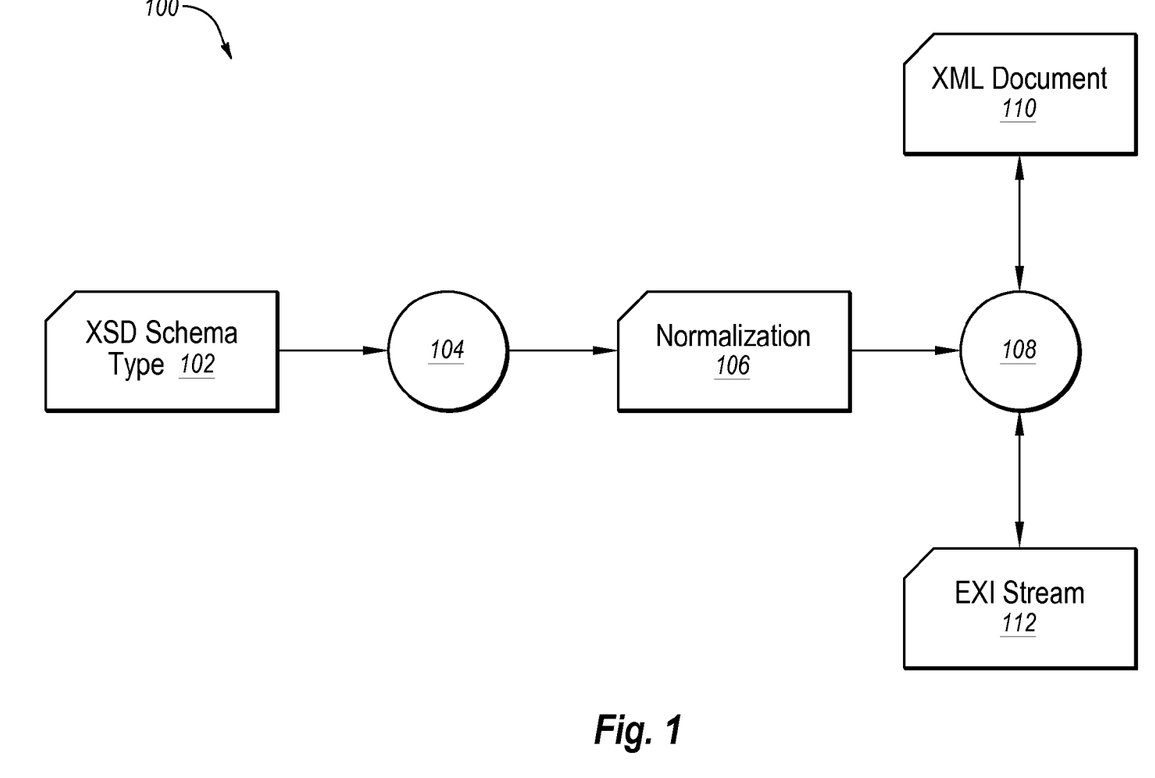
FIG. 1 is a block diagram of an example efficient extensible markup language interchange (EXI) processing system.

FIG. 1 is a block diagram of an example EXI processing system 100, arranged in accordance with at least some embodiments described herein. The EXI processing system 100 includes a normalization device 104. The normalization device 104 receives an XSD 102 and outputs a normalization 106. The normalization 106 may include, for instance, one or more grammars used by the EXI processing system 100. The normalization device 104 may include the EXI Format 1.0 Specification, which may include the standard grammar algorithm, as well as one or more embodiments of a modified grammar-generating algorithm (modified algorithm) as disclosed herein.

The normalization 106 may be communicated to an encoder/decoder 108. An example encoder/decoder 108 is included in the OpenEXI project hosted at SourceForge.net. The source code and documentation of the OpenEXI project as of the filing date of the present application are incorporated herein by reference in their entirety. The encoder/decoder 108 may be configured to receive as input an XML document 110 and encode the XML document 110 into an EXI stream 112. The EXI stream 112 may also be received as input by the encoder/decoder 108 where the EXI stream 112 may be decoded back into an XML document 110. The initial XML document 110 and the XML document 110 generated by the encoder/decoder 108 may include substantially identical XML data, although certain types of human-readable information items, such as whitespace, comments, and processing instructions, may not be preserved in the XML document 110 generated by the encoder/decoder 108, depending on the preserve settings of the encoder/decoder 108. The normalization device 104 may be employed in a device with limited memory capacity. Examples of devices with limited memory capacity include, but are not limited to, sensors or appliances.

Figure 2:
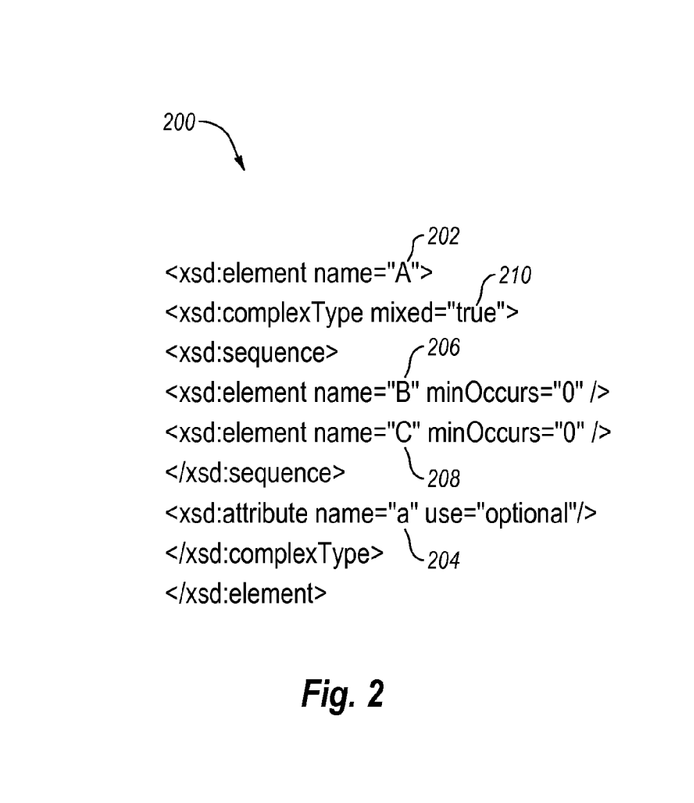
FIG. 2 illustrates an example extensible markup language schema definition (XSD) schema type that includes a mixed content type.

Some of the embodiments disclosed herein relate to generating grammars for XSD schema types that include a mixed content type. FIG. 2 illustrates an example XSD schema type 200 that includes a mixed content type. The XSD schema type 200 may be understood to indicate that an element A 202 may have attribute of a name "a" 204, which is optional. The attribute "a" 204 may be followed by a content that is a sequence of optional elements "B" 206 and "C" 208. Characters may be interspersed in the content including optional elements "B" 206 and "C" 208. The XSD schema type 200 is a mixed content type as indicated by the "true" 210. The mixed content is indicative of an XSD that has characters prior to or following the optional elements "B" 206 and/or "C" 208.

Figure 3:
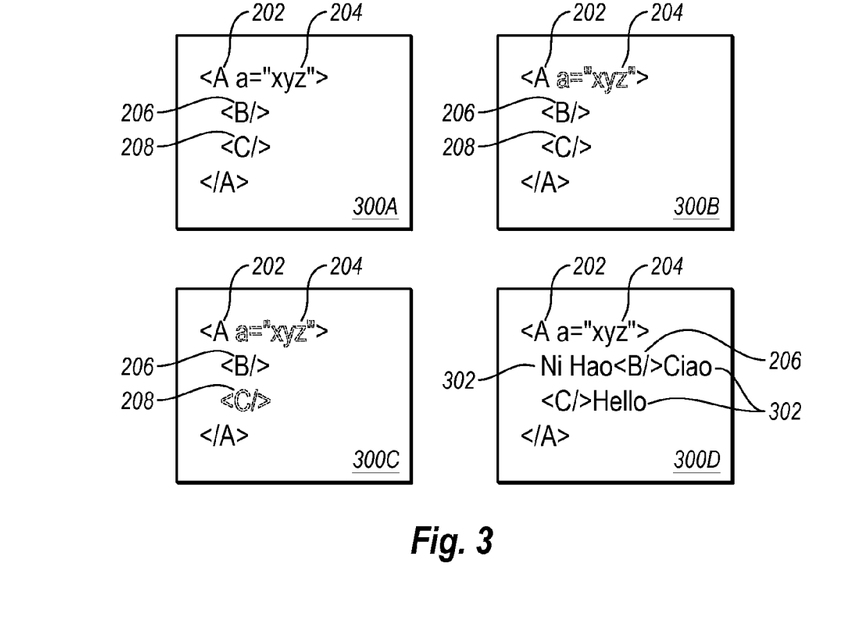
FIG. 3 illustrates example valid instances of the XSD schema type depicted in FIG. 2.

FIG. 3 illustrates example valid instances 300A-300D of the XSD schema type 200 depicted in FIG. 2, including a first valid instance 300A, a second valid instance 300B, a third valid instance 300C, and a fourth valid instance 300D. Optional features that may be omitted are depicted in some of the valid instances 300A-300D with dashed-hollow lettering to indicate that the feature in not included in the particular valid instance 300A-300D. With combined reference to FIGS. 2 and 3, the first valid instance 300A includes the optional attribute "a" 204 and both of the optional elements "B" 206 and "C" 208. However, the first valid instance 300A does not include interspersed characters. The second valid instance 300B includes both of the optional elements "B" 206 and "C" 208. However, the second valid instance 300B does not include interspersed characters or the optional attribute "a" 204. The third valid instance 300C includes the optional element "B" 206 but does not include the optional element "C" 208, the interspersed characters, or the optional attribute 204. The fourth valid instance 300D may contain mixed content characters as per permitted by the XSD schema type. The fourth valid instance 300D includes the optional attribute 204, both of the optional elements "B" 206 and "C" 208 as well as interspersed characters 302. The fourth valid instance 300D includes interspersed characters 302 prior to and following each of the optical components "B" 206 and "C" 208.

However, this depiction is not limiting to valid instances of XSD schema types that may contain mixed content characters. Specifically, in alternative embodiments, the interspersed characters 302 may appear prior to or following one of the optional elements "B" 206 or "C" 208 in any combination. For example, an embodiment may include the interspersed characters prior to the optional element "B" 206 but not after the optional element "C" 208.

Figure 4:
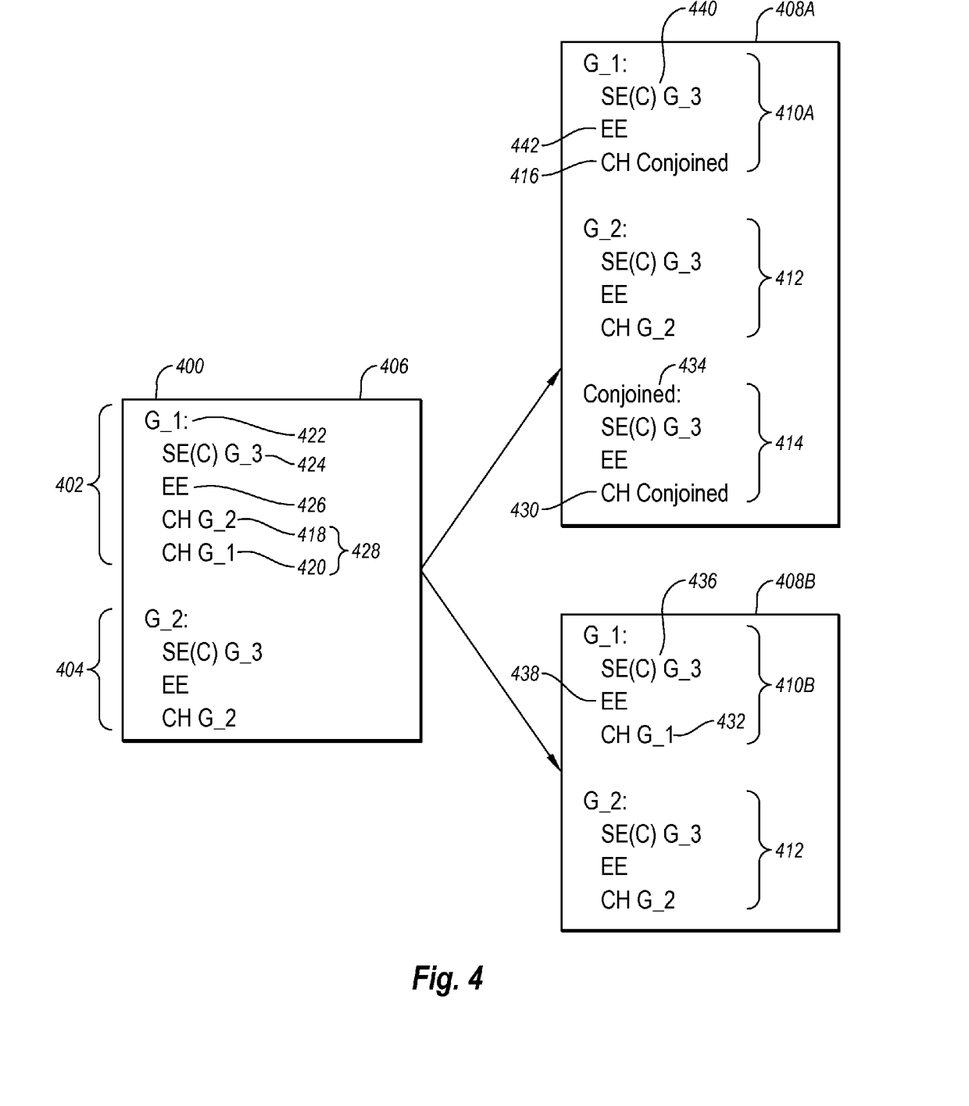
FIG. 4 illustrates a block diagram of an example normalization of a mixed content XSD schema type, which may represent the XSD schema type of FIG. 2.

To use the XSD schema type 200 in the EXI processing system 100 of FIG. 1, it may be beneficial to normalize the XSD schema type 200. FIG. 4 illustrates a block diagram of an example normalization of a mixed content XSD schema type 400 according to the standard grammar algorithm and according to an example embodiment of a modified algorithm. The mixed content XSD schema type 400 may represent the XSD schema type 200 of FIG. 2, or some portion thereof. To illustrate the normalization of the mixed content XSD schema type 400, FIG. 4 includes a first block, which is generally indicated by 406. The first block 406 depicts the mixed content XSD schema type 400 during normalization. FIG. 4 also includes a second block, which is generally indicated by 408A. The second block 408A depicts the mixed content XSD schema type 400 after normalization according to the standard grammar algorithm. FIG. 4 also includes a third block, which is generally indicated by 408B. The third block 408B depicts the mixed content XSD schema type 400 after normalization according to the modified algorithm. The first block 406 is illustrated with the second block 408A and the third block 408B in FIG. 4. However, in this and other embodiments, the first block 406 may proceed from the first block 406 to the second block 408A or from the first block 406 to the third block 408B, but not both. In some alternative embodiments, the first block 406 may proceed to the second block 408A, and then to the third block 408B.

The first block 406, the second block 408A, and the third block 408B include multiple states or grammars (e.g., 402, 404, 410A, 410B, 412, and 414). Grammars and states are similar. As used herein, the term "grammar" is used following normalization and the term "state" is used during normalization. The states or grammars may include one or more stages. The stages in the mixed content XSD schema type 400 include G_1, G_2, and G_3. Additionally, each of the states may accept multiple elements or events. Specific non-limiting examples of elements or events in FIG. 4 include a start element event (SE), an end element (EE), and character elements (CH).

With reference to a first state 402, a first line 422 may indicate a beginning stage G_1. Each subsequent line 424, 426, 418, and 420 may be referred to as a production. With reference to the first state 402 the productions are specifically referred to as productions 424, 426, 418, and 420, but are more generally referred to herein as productions. The productions 424, 426, 418, and 420 indicate options that may occur after the beginning stage G_1. For example, the first state 402 indicates that the beginning stage G_1 may be followed by a start element event SE(C) as in production 424, an end element event (EE) as in production 426, or a character event (CH) as in productions 418 and 420. The productions 424, 426, 418, and 420 may also indicate what will occur after a first subsequent event or element. For example, when the beginning stage G_1 is followed by the SE(C) as in production 424, a third stage G_3 will follow the SE(C). Likewise, when the beginning stage G_1 is followed by CH as in productions 418 and 420, a second stage G_2 or the first stage G_1 will follow. When the beginning stage G_1 is followed by EE as in production 426, an element will end rather than continuing to another stage.

As shown in the first block 406, the mixed content XSD schema type 400 may include the first state 402 and the second state 404. An XSD type of the mixed content XSD schema type 400 may be determined from an analysis of the productions in each of the first state 402 and the second state 404. Specifically, from an analysis of the productions, it may be determined whether the first state 402 and/or the second state 404 may be a mixed content type XSD. In an example analysis, when the first state 402 and/or the second state 404 include a conflict 428, the XSD type may be "mixed content type." In the mixed content XSD schema type 400, the first state 402 includes the conflict 428, but the second state 404 does not. This is not meant to be limiting. One or more states (e.g., 402 and 404) may include conflicts 428.

The conflict 428, when detected, may indicate mixed content is possible in the first state 402. The conflict 428 may include productions 418 and 420, which include an event resulting from a local production and an event resulting from a foreign production. Generally, a local production is a production leading to the beginning stage of the same state to which the production belongs, and a foreign production is a production leading to a stage of a different state. For example, the production 418 is a foreign production because it leads to the stage G_2 of the second state 404, which is a different state than the first state 402 to which the production 418 belongs. The production 420 is a local production because it leads to the beginning stage G_1 of the same state, e.g., the first state 402, to which the production 420 belongs. In the mixed content XSD schema type 400, the conflict 428 includes two character events (CH). In alternative embodiments, the conflict 428 may include other events, elements, or attributes. An example including attributes is discussed with reference to FIG. 7. Additionally, the conflict may include multiple foreign productions.

Referring to the second block 408A, using the standard grammar algorithm, the first state 402 may be normalized into a first grammar 410A and a conjoined grammar 414. The first grammar 410A may include productions 440 and 442. The productions 440 and 442 may be copies of the productions 424 and 426 of the first state 402. The productions 424 and 426 are not included in the conflict 428 and accordingly may be copied as productions 440 and 442 into the first grammar 410A. The productions 418 and 420 of the first state 402 may be normalized into a conjoined production 416 in the first grammar 410A that points to a conjoined stage 434. The conjoined production 416 is generally a union of the productions 418 and 420. The conjoined stage 434 may be defined according to the conjoined grammar 414, which also may be included in the third block 408A. Thus, when the first state 402 of the first block 406 is normalized according to the standard grammar algorithm, the first grammar 410A, a second grammar 412 (discussed below), and the conjoined grammar 414 of the second block 408A may be the result.

Referring to the third block 408B, an alternative normalization using the modified algorithm according to at least one embodiment described herein is depicted. When the XSD schema type 400 includes the mixed content type and/or when the conflict 428 is detected in the mixed content XSD schema type 400, a modified first grammar 410B may be generated. The modified first grammar 410B may include productions 436 and 438. The productions 436 and 438 may be copies of the productions 424 and 426 of the first state 402. The production 424 and 426 are not included in the conflict 428 and accordingly may be copied into the first modified grammar 410B as the productions 436 and 438. The modified first grammar 410B further includes a recursive production 432, which is a copy of the production 420 of the first state 402. The first modified grammar 410B, however, may not include the production 418 from the first state 402. As mentioned above, the production 420 is the local production and production 418 is the foreign production. Thus, the modified first grammar 410B substitutes the recursive production 432 for the conjoined production 416 of the second block 408A. The production 418 as well as any other foreign productions may be ignored.

Thus, using the modified algorithm, the first state 402, which may contain mixed content, may be normalized into the first modified grammar 410B. The first modified grammar 410B does not need the conjoined grammar 414 and ignores the production 420 and any other foreign productions involved in the conflict 428 (only one foreign production is shown in FIG. 4).

The second state 404 of the first block 406 does not include a conflict (e.g., conflict 428). Accordingly, the second state 404 may be copied to the second block 408A or 408B. The second state 404 becomes the second grammar 412, which may be a resulting grammar when the standard grammar algorithm or the modified algorithm is used. Accordingly, in some embodiments, the modified algorithm may enable use of the standard grammar algorithm when a conflict is not detected in a state or the modified algorithm may generate the second grammar 412, which is substantially identical to a grammar that may be generated by the standard grammar algorithm.

Accordingly, the modified algorithm may be used in normalization of the mixed content XSD schema type 400. The modified algorithm may result in a normalization including the modified grammar 410B and the second grammar 412 rather than a first grammar 410A, a second grammar 412, and a conjoined grammar 414. Thus, use of the modified algorithm may result in fewer grammars and/or fewer productions than the grammars generated from a normalization using the standard grammar algorithm. Specifically, in the example of FIG. 4, the modified algorithm results in two grammars and six productions, as compared to three grammars and nine productions resulting from the standard grammar algorithm. Additionally, the second block 408A is effectively equivalent to the third block 408B and will have substantially the same effect when used. Specifically, in this example, the second grammar 412 is equivalent. In addition, the conjoined grammar 414 includes a recursive production 430. The first modified grammar 410B incorporates the conjoined grammar 414 by including the recursive production 432.

Referring back to FIG. 2, the XSD schema type 200 may be normalized using the standard grammar algorithm or using the modified algorithm in a process similar to that described with reference to FIG. 4. When using the standard grammar algorithm, a normalization may include eight grammars and twenty-eight productions. When using the modified algorithm, a modified normalization may include six grammars and twenty-one productions. By reducing the number of grammars and productions, less memory is used which may be beneficial to systems with limited memory such as appliances and/or sensors.

Figure 5:
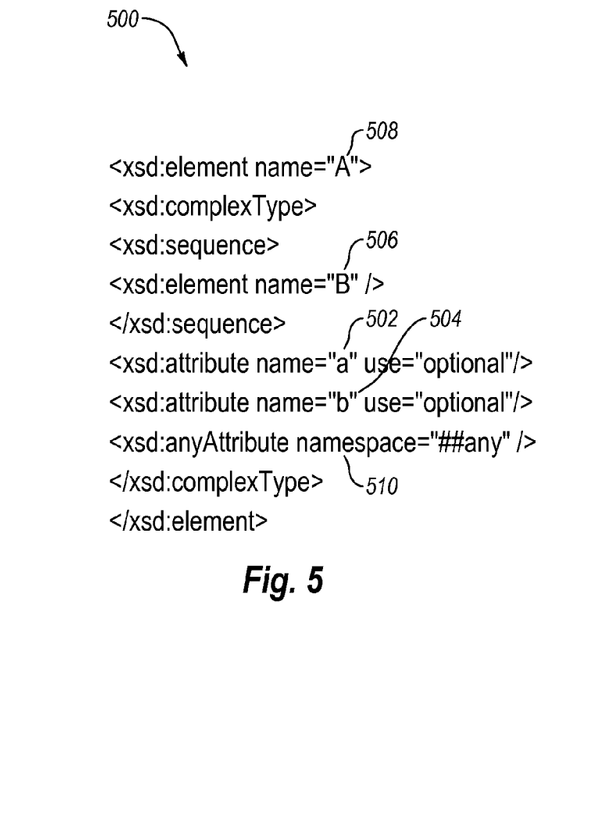
FIG. 5 illustrates an example XSD schema type that includes an attribute wildcard type.

Some of the embodiments disclosed herein relate to generating grammars for XSD schema types that include an attribute wildcard type. FIG. 5 illustrates an example XSD schema type 500 that includes an attribute wildcard type. The XSD schema type 500 may be understood to indicate that an element A 508 may have attributes of a name "a" 502 and "b" 504 in that order. The attributes "a" 502 and "b" 504 may be optional. The attributes "a" 502 and "b" 504 may be followed by a content that is an elements "B" 506. The XSD schema type 500 also includes an attribute wildcard 510, which may equal any attribute.

Figure 6:
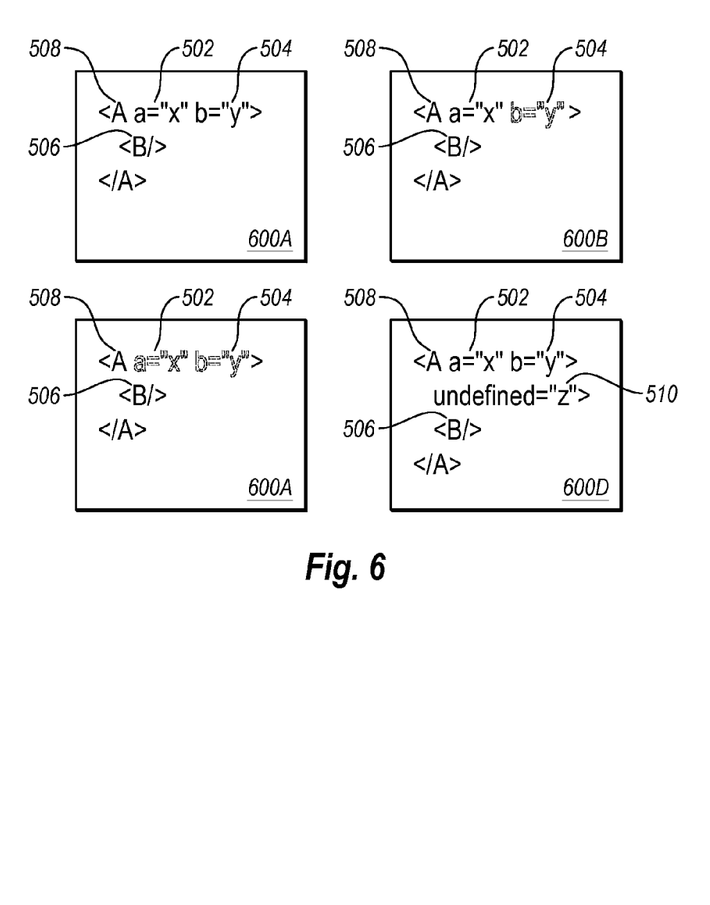
FIG. 6 illustrates example valid instances of the XSD schema type depicted in FIG. 5.

FIG. 6 illustrates example valid instances 600A-600D of the XSD schema type 500 depicted in FIG. 5, including a first valid instance 600A, a second valid instance 600B, a third valid instance 600C, and a fourth valid instance 600D. Optional features that may be omitted are depicted in some of valid instances 600A-600D with dashed-hollow lettering to indicate that the feature in not included in the particular valid instance 600A-600D. With combined reference to FIGS. 5 and 6, the first valid instance 600A includes the optional attributes "a" 502 and "b" 504 and the optional element "B" 506. However, the first valid instance 600A does not include the attribute wildcard 510. The second valid instance 600B includes the optional attribute "a" 502 and the optional element "B" 506, but not the optional attribute "b" 504 or the attribute wildcard 510. The third valid instance 600C includes the optional element "B" 506 but does not include the optional attributes "a" and "b" or the attribute wildcard 510. The fourth valid instance 600D is an XSD schema type with an attribute wildcard type. The fourth valid instance 600D includes the optional attributes "a" 502 and "b" 504, the optional element "B" 506, and the attribute wildcard 510. The attribute wildcard 510 is "undefined."

The fourth valid instance 600D of XSD schema type 500 with an attribute wildcard type depicted in FIG. 6 is not limiting. Specifically, in alternative embodiments, the attribute wildcard 510 including the "undefined" value may appear prior with any combination of the optional attributes "a" 502, "b" 504, and the optional element "B" 506.

Figure 7:
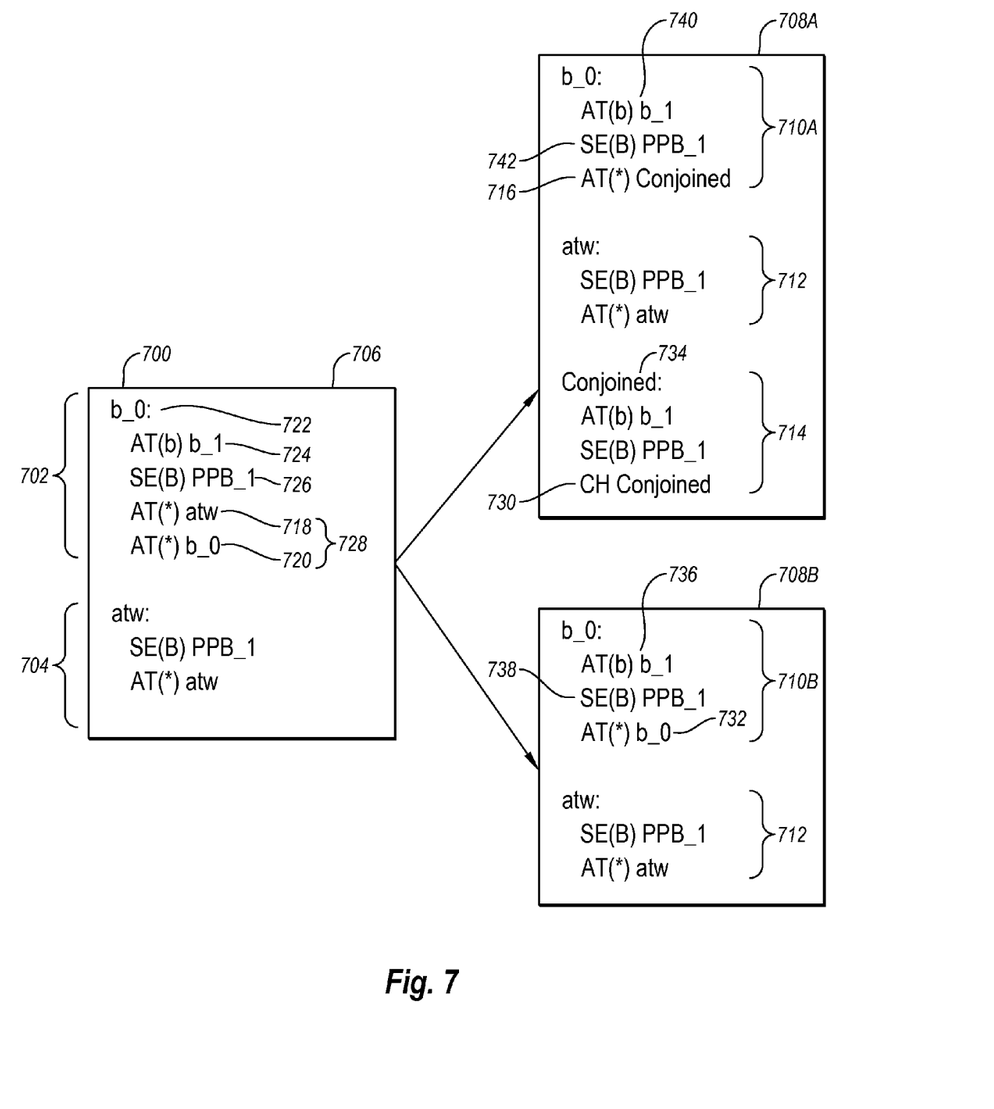
FIG. 7 illustrates a block diagram of an example normalization of an attribute wildcard XSD schema type, which may represent the XSD schema type of FIG. 5.

To use the XSD schema type 500 in the EXI processing system 100 of FIG. 1, it may be beneficial to normalize the XSD schema type 500. FIG. 7 illustrates a block diagram of an example normalization of an attribute wildcard XSD schema type 700 according to the standard grammar algorithm and according to an example modified algorithm. The attribute wildcard XSD schema type 700 may represent the XSD schema type 500 of FIG. 5 or some portion thereof. To illustrate the normalization of the attribute wildcard XSD schema type 700, FIG. 7 includes a first block, which is generally indicated by 706. The first block 706 depicts the attribute wildcard XSD schema type 700 during normalization. FIG. 7 also includes a second block, which is generally indicated by 708A. The second block 408A depicts the attribute wildcard XSD schema type 700 after normalization according to the standard grammar algorithm. FIG. 7 also includes a third block, which is generally indicated by 708B. The third block 708B depicts the attribute wildcard XSD schema type 700 after normalization according to the modified algorithm. The first block 706 is illustrated with the second block 708A and the third block 708B in FIG. 7. However, in this and other embodiments, the first block 706 may proceed from the first block 706 to the second block 708A or from the first block 706 to the third block 708B, but not both. In some alternative embodiments, the first block 706 may proceed to the second block 708A, and then to the third block 708B.

The first block 706, the second block 708A, and the third block 708B include multiple states or grammars (e.g., 702, 704, 710A, 710B, 712, and 714). As with reference to FIG. 4, the term "states" is used during normalization and the term "grammars" is used following normalization. The states or grammars may include multiple stages. The stages in the attribute wildcard XSD schema type 700 include b_1, b_0, PPB_1, and atw. Additionally, each of the states may accept multiple elements or events. Specific non-limiting examples of elements or events in FIG. 7 include a start element event (SE), an attribute event (AT), and character elements (CH).

The states and grammars of the attribute wildcard XSD schema type 700 indicate sequences of events and stages similar to that discussed with reference to FIG. 4. For instance, a first state 702 may include a first line 722 indicating a beginning stage b_0. Each subsequent line 724, 726, 718, and 720 may be productions, which may indicate options that may occur after the beginning stage b_0.

As shown in the first block 706, the attribute wildcard XSD schema type 700 may include the first state 702 and a second state 704. An XSD type of the attribute wildcard XSD schema type 700 may be determined from an analysis of the productions in each of the first state 702 and second state 704. Specifically, from an analysis of the productions, it may be determined whether the first state 702 and/or the second state 704 may be an attribute wildcard type XSD. In an example analysis, when the first state 702 and/or the second state 704 include a conflict 728, the XSD type may be "attribute wildcard type." In the attribute wildcard XSD schema type 700, the first state 702 includes the conflict 728, but the second state 704 does not. This is not meant to be limiting. One or more states (e.g., 702 and 704) may include conflicts 728.

The conflict 728, when detected, may indicate an attribute wildcard is possible in the first state 702. The conflict 728 may include productions 718 and 720, which include an event resulting from a local production and an event resulting from a foreign production. For example, the production 718 is a foreign production because it leads to the stage atw of the second state 704, which is a different state than the first state 702 to which the production 718 belongs. The production 720 is a local production because it leads to the beginning stage b_0 of the same state, e.g., the first state 702, to which the production 720 belongs. In the attribute wildcard XSD schema type 700, the conflict 728 includes two attribute events (AT(*)). In alternative embodiments the conflict 728 may include other events, elements, or attributes. Additionally, the conflict 728 may include multiple foreign productions.

Referring to the second block 708A, using the standard grammar algorithm, the first state 702 may be normalized into a first grammar 710A and a conjoined grammar 714. The first grammar 710A may include productions 740 and

742. The productions 740 and 742 may be copies of the productions 724 and 726 of the first state 702. The production 724 and 726 are not included in the conflict 728 and accordingly may be copied into the first grammar 710A as productions 740 and 742. The productions 718 and 720 of the first state 702 may be normalized into a conjoined production 716 in the first grammar 710A that points to a conjoined stage 734. The conjoined production 716 is generally a union of the productions 718 and 720. The conjoined stage 734 may be defined according to the conjoined grammar 714, which also may be included in the second block 708A. Thus, when the first state 702 is normalized according to the standard grammar algorithm, the first grammar 710A and the conjoined grammar 714 may be the result.

Referring to the third block 708B, an alternative normalization using the modified algorithm according to at least one embodiment described herein is depicted. When the XSD schema type 700 includes the attribute wildcard type and/or when the conflict 728 is detected in the attribute wildcard XSD schema type 700, a modified first grammar 710B may be generated. The modified first grammar 710B may include productions 736 and 738. The productions 736 and 738 may be copies of the productions 724 and 726 of the first state 702. The production 724 and 726 are not included in the conflict 728 and accordingly may be copied into the first modified grammar 710B as the productions 736 and 738. The modified first grammar 710B further includes a recursive production 732, which is a copy of the production 720 of the first state 702. The first modified grammar 710B, however, may not include the production 718 from the first state 702. As mentioned above, the production 720 is the local production and production 718 is the foreign production. Thus, the modified first grammar 710B substitutes the recursive production 732 for the conjoined production 716 of the second block 708A. The production 718 as well as any other foreign productions may be ignored.

Thus, using the modified algorithm, the first state 702, which may have attribute wildcard, may be normalized into the first modified grammar 710B. The first modified grammar 710B does not need the conjoined grammar 714 and ignores the production 720 and any other foreign productions involved in the conflict 728 (only one foreign production is shown in FIG. 7).

The second state 704 of the first block 706 does not include a conflict (e.g., the conflict 728). Accordingly, the second state 704 may be copied to the second block 708A or 708B. The second state 704 becomes the second grammar 712, which may be a resulting grammar when the standard grammar algorithm or the modified algorithm is used. Accordingly, in some embodiments, the modified algorithm may enable use of the standard grammar algorithm when a conflict is not detected in a state or the modified algorithm may generate the second grammar 712, which is substantially identical to a grammar that may be generated by the standard grammar algorithm.

Accordingly, the modified algorithm may be used in normalization of the attribute wildcard XSD schema type 700. The modified algorithm may result in a normalization including the modified grammar 710B and the second grammar 712 rather than a first grammar 710A, a second grammar 712, and a conjoined grammar 714. Thus, use of the modified algorithm may result in fewer grammars and/or fewer productions than the grammars generated from a normalization using the standard grammar algorithm. Specifically, in the example of FIG. 7, the modified algorithm results in two grammars and five productions, as compared to three grammars and eight productions resulting from the standard grammar algorithm. Additionally, the second block 708A is effectively equivalent to the third block 708B and will have substantially the same effect when used. Specifically, in this example, the second grammar 712 is equivalent. In addition, the conjoined grammar 714 includes a recursive production 730. The first modified grammar 710B incorporates the conjoined grammar 714 by including the recursive production 732.

Referring back to FIG. 5, the XSD schema type 500 may be normalized using the standard grammar algorithm or using the modified algorithm in a process similar to that described with reference to FIG. 7. When using the standard grammar algorithm, a normalization may include nine grammars and twenty-three productions. When using the modified algorithm, a modified normalization may include seven grammars and fifteen productions. By reducing the number of grammars and productions, less memory is used which may be beneficial to systems with limited memory such as appliances and/or sensors.

Figure 8:
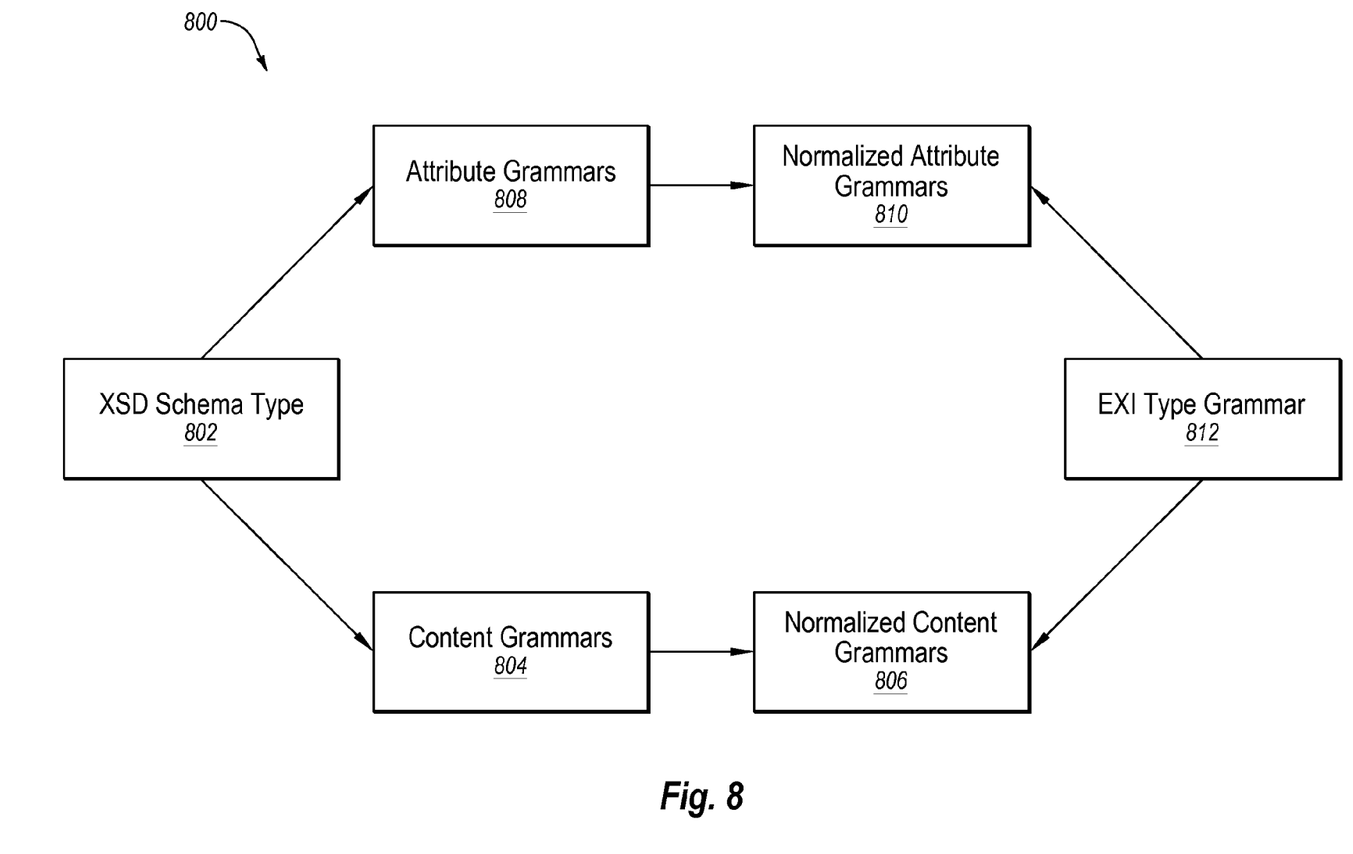
FIG. 8 is a flow chart of an example progression of processing a complex XSD schema type.

FIG. 8 is a flow chart of an example progression 800 of processing a complex XSD schema type 802. The XSD schema type 802 may include a mixed content portion and an attribute portion. The mixed content portion may be processed through blocks 804 and 806. The attribute portion may be processed through blocks 808 and 810. Processing the mixed content portion may include development of content grammars in block 804. The content grammars may then be normalized as generally described with reference to FIG. 4, to generate the normalized content grammars of block 806. Likewise, processing the attribute portion may include development of attribute grammars in block 808. The attribute grammars 808 may be normalized as generally described with reference to FIG. 7 to generate normalized attribute grammars in block 810. The normalized attribute grammars of block 810 and the normalized content grammars of block 806 may be concatenated to form an EXI type grammar in block 812 for the XSD schema type 802.

Figure 9:
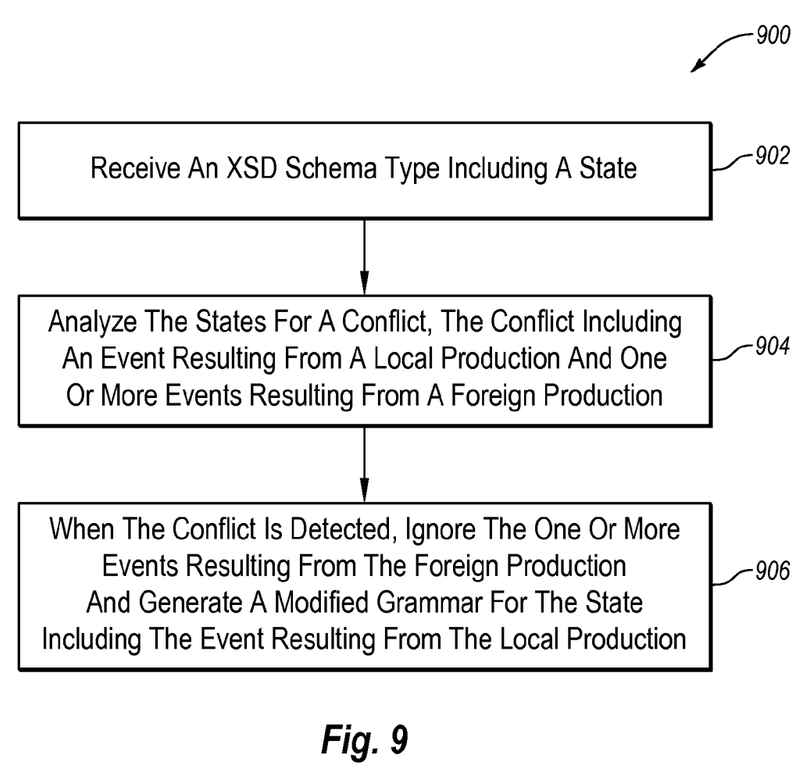
FIG. 9 is a flow chart of an example method of normalizing an XSD schema type.

FIG. 9 is a flow chart of an example method 900 of normalizing an XSD schema type. The method 900 may be implemented, in some embodiments, by an EXI processing system, such as the example EXI processing system 100 of FIG. 1. For example, the EXI processing system 100 of FIG. 1 may be configured to execute computer instructions to perform operations of normalizing an XSD schema type as represented by one or more of blocks 902, 904, and/or 906 of the method 900. Although illustrated as discrete blocks, various blocks may be divided into additional blocks, combined into fewer blocks, or eliminated, depending on the desired implementation. The method 900 will now be discussed with reference to FIG. 9.

The method 900 may begin at block 902, in which an XSD schema type is received. The XSD schema type may include one or more states. In block 904, the states are analyzed for a conflict. The conflict may include an event resulting from a local production and one or more events resulting from a foreign production. For example, the conflict may include two or more character events or two or more attribute events.

In block 906, when the conflict is detected, a modified grammar for the state is generated. In the modified grammar, the one or more events resulting from the foreign production are ignored and the event resulting from the local production is included in the modified grammar. The modified grammar may include fewer grammars and/or fewer productions than grammars generated from a standard grammar algorithm.

The modified grammars may have substantially the same effect as the grammars generated from a standard grammar algorithm.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, when the conflict is not detected, a grammar may be generated for the state from a standard grammar algorithm. Additionally or alternatively, the method 900 may include determining whether an XSD type of the XSD schema type includes an attribute wildcard type or a mixed content type.

Embodiments described herein may include a tangible and/or non-transitory computer-readable medium having encoded therein programming code executable by a processing device to perform the method 900 of FIG. 9 and/or variations thereof. The processing device may be included in the EXI processing system 100 of FIG. 1, for example.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data, which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of normalizing an extensible markup language schema definition (XSD) schema type for use in encoding and/or decoding an extensible markup language (XML) document, the method comprising:
   receiving an XSD schema type including a state;
   analyzing the state for a conflict, the conflict including an event resulting from a local production and one or more events resulting from a foreign production; and
   when the conflict is detected, ignoring the one or more events resulting from the foreign production and generating a modified grammar for the state including the event resulting from the local production.

2. The method of claim 1, further comprising when the conflict is not detected, generating a grammar for the state using a standard grammar algorithm.

3. The method of claim 1, further comprising determining whether an XSD type of the XSD schema type includes an attribute wildcard type or a mixed content type.

4. The method of claim 1, wherein the modified grammar includes fewer grammars and/or fewer productions than grammars for the XSD schema type generated using a standard grammar algorithm.

5. The method of claim 1, wherein the event resulting from the local production and the one or more events resulting from the foreign production include attribute wildcard events.

6. The method of claim 1, wherein the event resulting from the local production and the one or more events resulting from the foreign production include character events.

7. The method of claim 1, wherein a normalization including the modified grammar reduces memory usage when compared to a normalization for the XSD schema type including grammars for the state generated by a standard grammar algorithm.

8. The method of claim 7, further comprising converting an XML document to an efficient XML interchange (EXI) representation of the XML document using the normalization.

9. The method of claim 1, wherein the generating includes substituting a recursive production for a conjoined production.

10. The method of claim 1, wherein the XSD schema type is applicable to an extensible markup language (XML) document.

11. The method of claim 1, wherein the XSD schema type includes a mixed content type or an attribute wildcard type.

12. The method of claim 1, wherein the conflict includes two or more character events or two or more attribute events.

13. The method of claim 1, further comprising incorporating the modified grammar into a normalization of the XSD schema type.

14. A non-transitory computer-readable medium having encoded therein programming code executable by a processor to perform operations comprising:
   receiving an XSD schema type including a state;

analyzing the state for a conflict, the conflict including an event resulting from a local production and one or more events resulting from a foreign production; and when the conflict is detected, ignoring the one or more events resulting from the foreign production and generating a modified grammar for the state including the event resulting from the local production.

15. The non-transitory computer-readable medium of claim 14, wherein the operations further comprise when the conflict is not detected, generating a grammar for the state using a standard grammar algorithm.

16. The non-transitory computer-readable medium of claim 14, wherein the operations further comprise determining whether an XSD type of the XSD schema type includes an attribute wildcard type or a mixed content type.

17. The non-transitory computer-readable medium of claim 14, wherein the modified grammar includes fewer grammars and/or fewer productions than grammars for the XSD schema type generated using a standard grammar algorithm.

18. The non-transitory computer-readable medium of claim 14, wherein the event resulting from the local production and the one or more events resulting from the foreign production include attribute wildcard events.

19. The non-transitory computer-readable medium of claim 14, wherein the event resulting from the local production and the one or more events resulting from the foreign production include character events.

20. The non-transitory computer-readable medium of claim 14, wherein a normalization including the modified grammar reduces memory usage when compared to a normalization for the XSD schema type including grammars for the state generated by a standard grammar algorithm.

21. The non-transitory computer-readable medium of claim 20, wherein the operations further comprise converting an XML document to an efficient XML interchange (EXI) representation of the XML document using the normalization.

22. The non-transitory computer-readable medium of claim 14, wherein the generating includes substituting a recursive production for a conjoined production.

23. The non-transitory computer-readable medium of claim 14, wherein the XSD schema type applicable to an extensible markup language (XML) document.

24. The non-transitory computer-readable medium of claim 14, wherein the XSD schema type includes a mixed content type or an attribute wildcard type.

25. The non-transitory computer-readable medium of claim 14, wherein the conflict includes two or more character events or two or more attribute events.

26. The non-transitory computer-readable medium of claim 14, wherein the operations further comprise incorporating the modified grammar into a normalization of the XSD schema type.

* * * * *